B. V. LOUTZKOY.
PNEUMATIC HUB FOR VEHICLE WHEELS.
APPLICATION FILED MAY 21, 1920.

1,426,888.

Patented Aug. 22, 1922.
2 SHEETS—SHEET 1.

Inventor:
Boris von Loutzkoy
By C. P. Goepel
his Attorney

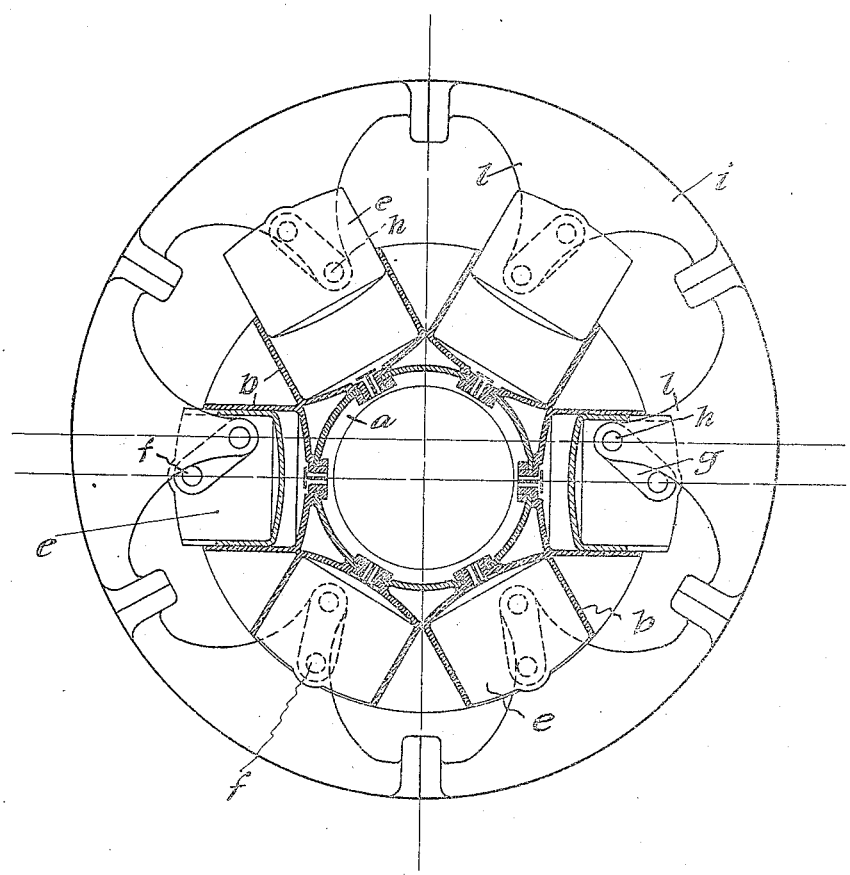

UNITED STATES PATENT OFFICE.

BORIS V. LOUTZKOY, OF ANDREEWKA, RUSSIA.

PNEUMATIC HUB FOR VEHICLE WHEELS.

1,426,888.  Specification of Letters Patent.  Patented Aug. 22, 1922.

Application filed May 21, 1920.  Serial No. 383,327.

*To all whom it may concern:*

Be it known that I, BORIS VON LOUTZKOY, Diplom-Engineer, a subject of Russia, and residing at Andreewka, Gouvernement Taurien, Russia, have invented certain new and useful Improvements in Pneumatic Hubs for Vehicle Wheels, of which the following is a specification.

The present invention relates to cushioned wheels of the pneumatic type.

An object of the present invention is to provide a relatively strong and compact construction of pneumatic cushioned wheel wherein are employed spokes of cylinder and piston construction and wherein the rim of the wheel is provided with inwardly extending arms adapted to project into the pistons and having relative lateral movement therein, the invention embodying features permitting of a relatively wide path of movement of the arms in the pistons without detracting from the strength of the coupling parts.

Another object of this invention is to provide an improved crank pin mounting which permits the positioning of the pin upon the extreme inner end of the arm of the rim to admit of the relatively small formation of the inner end of the arm so as not to take up any appreciable amount of space within the piston.

The above and various other objects and advantages of this invention will in part be described in, and in part be understood from, the following detailed description of the present preferred embodiment, the same being illustrated in the accompanying drawings, wherein:

Fig. 4 is a side elevation, partly diagrammatic, of an entire wheel structure embodying the features of this invention.

Referring to the drawings, *a* designates a hub of any suitable type and which carries thereon a plurality of radially extending cylinders *b* which are fixed to the hub and in which are slidably mounted a corresponding number of radially movable pistons *e*.

The pistons *e* have wrist pins *f* upon which are mounted links *g*. The links *g* extend into the pistons *e* from the wrist pins *f* and the links are pivotally connected at their inner ends to crank pins *h* carried by the rim *i*.

The rim *i* is arranged about the hub *a* and its parts and is provided, for each piston *e*, with an inwardly extending arm *l* adapted to project into the outer open ends of the pistons *e*.

The arms *l* carry the crank pins *h* and consequently the arms are adapted to move laterally within the cylinders *e*, and the extent of movement of the arms *l* depends upon the width of the arms, and consequently it is necessary to reduce the width of the arms as much as possible to obtain the desired flexibility of the wheel.

At the same time the crank pins *h* must be of sufficient size to ably support the adjacent piston *e* and consequently means is provided by this invention for firmly attaching the pin *h* to the relatively small inner end of the arm *l*.

Figure 3:
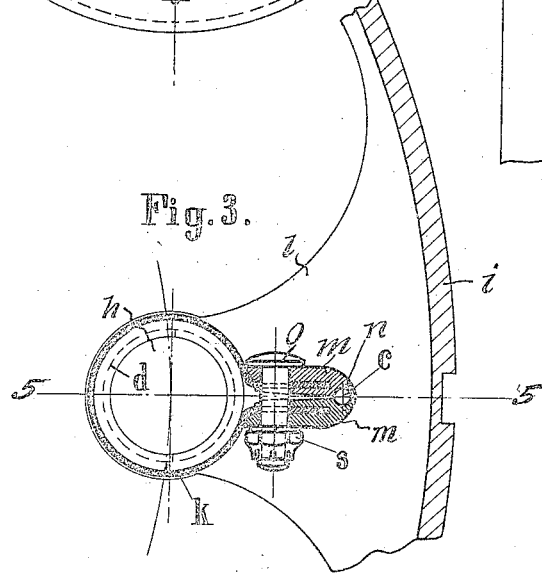
Fig. 3 is a fragmentary enlarged section of a portion of the wheel rim showing one of the crank pin mountings in section.
Figure 5:
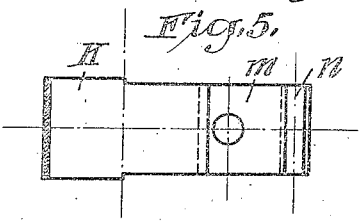
Fig. 5 is a section through the retaining band on the line 5—5 of Fig. 3, showing the inner side thereof.

As shown particularly in Fig. 3, the pin *h* is mounted in a ring *d* which is fitted to the inner end of the arm *l*, which is held therein by a clamping band *k* of sheet metal or the like, which extends about the ring *d* and which has its opposite ends fitted in clamping jaws *m* which are slitted to receive the free ends of the band *k*.

Figure 1:
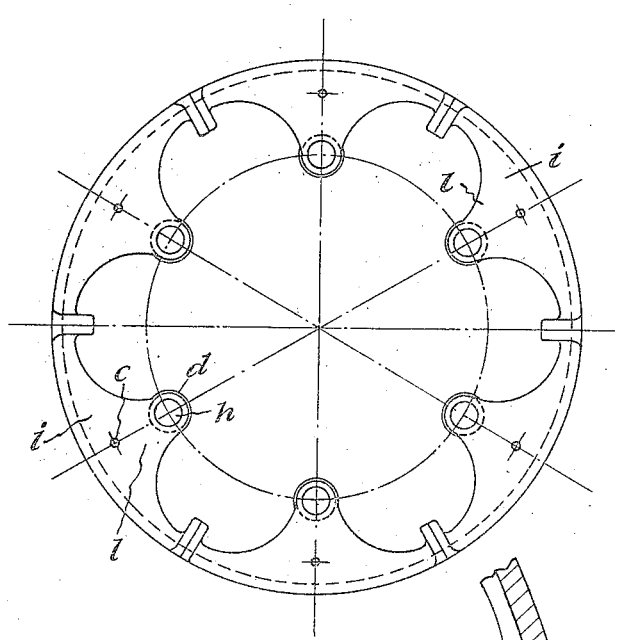
Fig. 1 is a side elevation of a wheel rim embodying features of the present invention.
Figure 2:
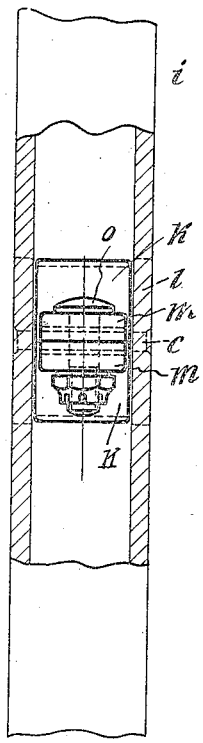
Fig. 2 is an edge view partly in section and enlarged, of a portion of the rim, showing a crank pin mounting.

The clamping jaws *m* are recessed in their inner opposed faces at their outer ends as at *n* for clamping engagement about a transverse pin *c* secured in the arm *l*. The arms *l*, as best seen from Fig. 2, are forked to receive the bearing parts therebetween.

The jaws *m* are bound together by a clamping bolt *o* of any suitable construction which is secured through the inner ends of the jaws *m* and bind the same together for not only clamping the jaws *m* on the fixed pin *c*, but also for drawing the band *k* taut about the retaining ring *d*.

In this manner the crank pin *h* is firmly held to the inner end of the arm *l* without the necessity of making the arm *l* of sufficient width to support the crank pin *h* and withstand the various stresses imposed through the pin *h* and the arm.

The stresses are taken up by the ring *d* and band $k$ and transmitted therethrough to the transverse pin $c$ and to the recessed inner end of the arm $l$.

What is claimed is:

1. In a pneumatic cushioned wheel, a rim, a hub, a plurality of cylinders carried by the hub, pistons mounted in the cylinders, said rim having inwardly extending arms adapted to project into the pistons and being relatively narrow, links connecting the inner ends of the arms to the pistons and including crank pins mounted on the arms engaging the links, and retaining means for the crank pins embodying rings fitted upon said crank pins, bands engaging about the rings, and means for clamping the bands on the rings and to the ends of the arms.

2. In a pneumatic cushioned wheel, a hub, a rim provided with a plurality of arms extending toward the hub, cylinders mounted on the hub, pistons in the cylinders adapted to receive the inner ends of said arms therein, links pivoted to the pistons, crank pins carried upon the free ends of the links, retaining rings seated in the inner ends of the arms and engaging said crank pins, bands encircling said rings, clamping jaws mounted on the ends of said bands, fixed pins carried by the inwardly extending arms in spaced relation to the inner ends thereof, and means for clamping said jaws together and upon said fixed pins for drawing said bands taut about the retaining rings.

In testimony whereof I affix my signature in presence of two witnesses.

BORIS v. LOUTZKOY.

Witnesses:
PAUL GORN,
A. SCHNELL.